(12) United States Patent
Cook et al.

(10) Patent No.: US 8,417,481 B2
(45) Date of Patent: Apr. 9, 2013

(54) SYSTEMS AND METHODS FOR ADAPTIVE SMART ENVIRONMENT AUTOMATION

(76) Inventors: Diane J. Cook, Pullman, WA (US); Parisa Rashidi, Pullman, WA (US)

(*) Notice: Subject to any disclaimer, the term of this patent is extended or adjusted under 35 U.S.C. 154(b) by 564 days.

(21) Appl. No.: 12/552,998

(22) Filed: Sep. 2, 2009

(65) Prior Publication Data

US 2010/0063774 A1 Mar. 11, 2010

Related U.S. Application Data

(60) Provisional application No. 61/096,257, filed on Sep. 11, 2008.

(51) Int. Cl.
*G06F 17/18* (2006.01)
*G06Q 10/00* (2012.01)

(52) U.S. Cl. ..................... 702/181; 705/7.15

(58) Field of Classification Search .............. 702/181, 702/1, 81, 84, 127, 179, 182–183, 188–189; 703/2; 705/2, 7.11–7.13, 7.15, 7.23, 7.38, 705/7.41–7.42, 325; 706/16, 20–21, 23, 706/25, 44–45, 48, 59; 700/1, 9, 11–12, 700/19–20, 28–34, 44, 47–49, 52, 91, 93, 700/108–111

See application file for complete search history.

(56) References Cited

U.S. PATENT DOCUMENTS

2003/0229471 A1* 12/2003 Guralnik et al. ............ 702/182

OTHER PUBLICATIONS

G.D. Abowd and E.D. Mynatt. Designing for the human experience in smart environments. Smart Environments: Technology, Protocols and Applications (D. Cook and S. Das, eds.), pp. 153-174, 2005.
R. Agrawal and R. Srikant. Mining sequential patterns. Proceedings of the International Conference on Data Engineering, pp. 3-14, 1995.
R. Begg and R. Hassan. Artificial Neural Networks in Smart Homes. Designing Smart Homes. Lecture Notes in Artificial Intelligence 4008. (J.C. Augusto and C.D. Nugent, eds.) pp. 146-164, Springer-Verlag, 2006.
L. Borodulkin, H. Ruser, and H.-R. Trankler. 3D virtual smart home user interface. Proceedings of the IEEE International Symposium on Virtual and Intelligent Measurement Systems, pp. 111-115, 2002.
J.P. Chin, V.A. Diehl, and K.L. Norman. Development of an instrument measuring user satisfaction of the human-computer interface. Proceedings of SIGCHI, pp. 213-218, 1988.
G. Demiris, M. Rantz, M. Aud, K. Marek, H. Tyrer, M. Skubic, and A. Hassam. Older adults' attitudes towards and perceptions of 'smart home' technologies. Medical Informatics and the Internet in Medicine, 29(2):87-94, 2004.

(Continued)

*Primary Examiner* — Toan Le
(74) *Attorney, Agent, or Firm* — Lee & Hayes, PLLC

(57) ABSTRACT

Several embodiments of systems and methods for adaptive smart environment automation are described herein. In one embodiment, a computer implemented method includes determining a plurality of sequence patterns of data points in a set of input data corresponding to a plurality of sensors in a space. The input data include a plurality of data points corresponding to each of the sensors, and the sequence patterns are at least partially discontinuous. The method also includes generating a plurality of statistical models based on the plurality of sequence patterns, and the individual statistical models corresponding to an activity of a user. The method further includes recognizing the activity of the user based on the statistical models and additional input data from the sensors.

21 Claims, 14 Drawing Sheets

OTHER PUBLICATIONS

T. Fawcett and F. Provost. Activity monitoring: Noticing interesting changes in behavior. Proceedings of the International Conference on Knowledge Discovery and Data Mining, pp. 53-62, 1999.

A. Fox, B. Johanson, P. Hanrahan, and T. Winograd. Integrating information appliances into an interactive workspace. IEEE Computer Graphics and Applications, 20(3):54-65, 2000.

J.D. Gould and C. Lewis. Designing for usability—key principles and what designers think. Proceedings of the ACM CHI Conference on Human Factors in Computing Systems, pp. 50-53, 1983.

H. Hagras, F. Doctor, A. Lopez, and V. Callaghan. An incremental adaptive life long learning approach for type-2 fuzzy embedded agents in ambient intelligent environments. IEEE Transactions on Fuzzy Systems, 15(1):41-55, 2007.

E. Heierman and D. Cook. Improving home automation by discovering regularly occurring device usage patterns. Proceedings of the International Conference on Data Mining, pp. 537-540, 2003.

A. Helal, W. Mann, H. El-Zabadani, J. King, Y. Kaddoura, and E. Jansen. The Gator Tech Smart House: A programmable pervasive space. IEEE Computer, 38(3):50-60, 2005.

S. Laxman and P.S. Sastry. A survey of temporal data mining. (abstract only) Sadhana, 13(2):173-198, 2006.

I.L. Liao, D. Fox, and H. Kautz. Location-based activity recognition using relational Markov networks. Proceedings of the International Joint Conference on Artificial Intelligence, pp. 773-778, 2005.

M. Mozer. The Neural Network House: An environment that adapts to its inhabitants. Proceedings of the National Conference on Artificial Intelligence, (M. Coen, ed.) pp. 110-114, 1998.

P. Rashidi, G.M. Youngblood, D. Cook, and S. Das. Inhabitant Guidance of Smart Environments. Proceedings of the International Conference on Human-Computer Interaction, 2007.

J.F. Roddick and M. Spiliopoulou. A survey of temporal knowledge discovery paradigms and methods, IEEE Transactions on Knowledge and Data Engineering, 14(4):750-767, 2002.

E.M. Tapia, S.S. Intille, and K. Larson. Activity recognition in the home using simple and ubiquitous sensors. Proceedings of Pervasive, pp. 158-175, 2004.

S.V. Vaseghi. State duration modelling in hidden Markov models. Signal Processing, 41(1):31-41, 1995.

G.M. Youngblood and D.J. Cook. Data mining for hierarchical model creation. IEEE Transactions on Systems, Man, and Cybernetics, Part C, 37(4):1-12, 2007.

D. Cook and S. Das. Smart Environments: Technology, Protocols and Applications. Wiley, 2004.

D. Norman and S. Draper. User Centered System Design: New Perspectives on Human-Computer Interaction. Lawrence Erlbaum Associates, 1986.

R. Sutton and A. Barto. Reinforcement Learning: An Introduction. MIT Press, 1998.

* cited by examiner

SYSTEMS AND METHODS FOR ADAPTIVE SMART ENVIRONMENT AUTOMATION

CROSS-REFERENCE TO RELATED APPLICATION

This application claims priority to U.S. Provisional Application No. 61/096,257, filed on Sep. 11, 2008, the disclosure of which is incorporated herein by reference in its entirety.

STATEMENT REGARDING FEDERALLY SPONSORED RESEARCH

This work was supported by National Science Foundation Grants # IIS-0121297 and # IIS-0647705 and National Institutes of Health Subcontract #1R21 DA024294-01.

TECHNICAL FIELD

This technology is related to systems and methods for smart environment automation. In particular, the technology is related to systems and methods for activity recognition and modeling in a smart environment.

BACKGROUND

There has always been a need for people to live in places that provide shelter, basic comfort, and support. As society and technology advance, there is a growing interest in improving the intelligence of the environments in which we live and work. Recently, various machine learning and artificial intelligence techniques were integrated into home environments equipped with sensors and actuators. However, there is still a need for improving the ease of integrating such smart environment technology into the lifestyle of its residents.

DETAILED DESCRIPTION SECTION

This disclosure describes systems and methods for smart environment automation. In particular, several embodiments are related to systems and methods for discovering and/or recognizing patterns in resident behavior and generating automation polices based on these patterns. As used herein, a "smart environment" generally refers to an environment associated with systems and components (both software and hardware) that can acquire and apply knowledge about physical settings and activity patterns of residents in the environment. Several of the details set forth below are provided to describe the following embodiments and methods in a manner sufficient to enable a person skilled in the relevant art to practice, make, and use them. Several of the details and advantages described below, however, may not be necessary to practice certain embodiments and methods of the technology. A person of ordinary skill in the relevant art, therefore, will understand that the technology may have other embodiments with additional elements, and/or may have other embodiments without several of the features shown and described below with reference to FIGS. 1-17.

Figure 1:
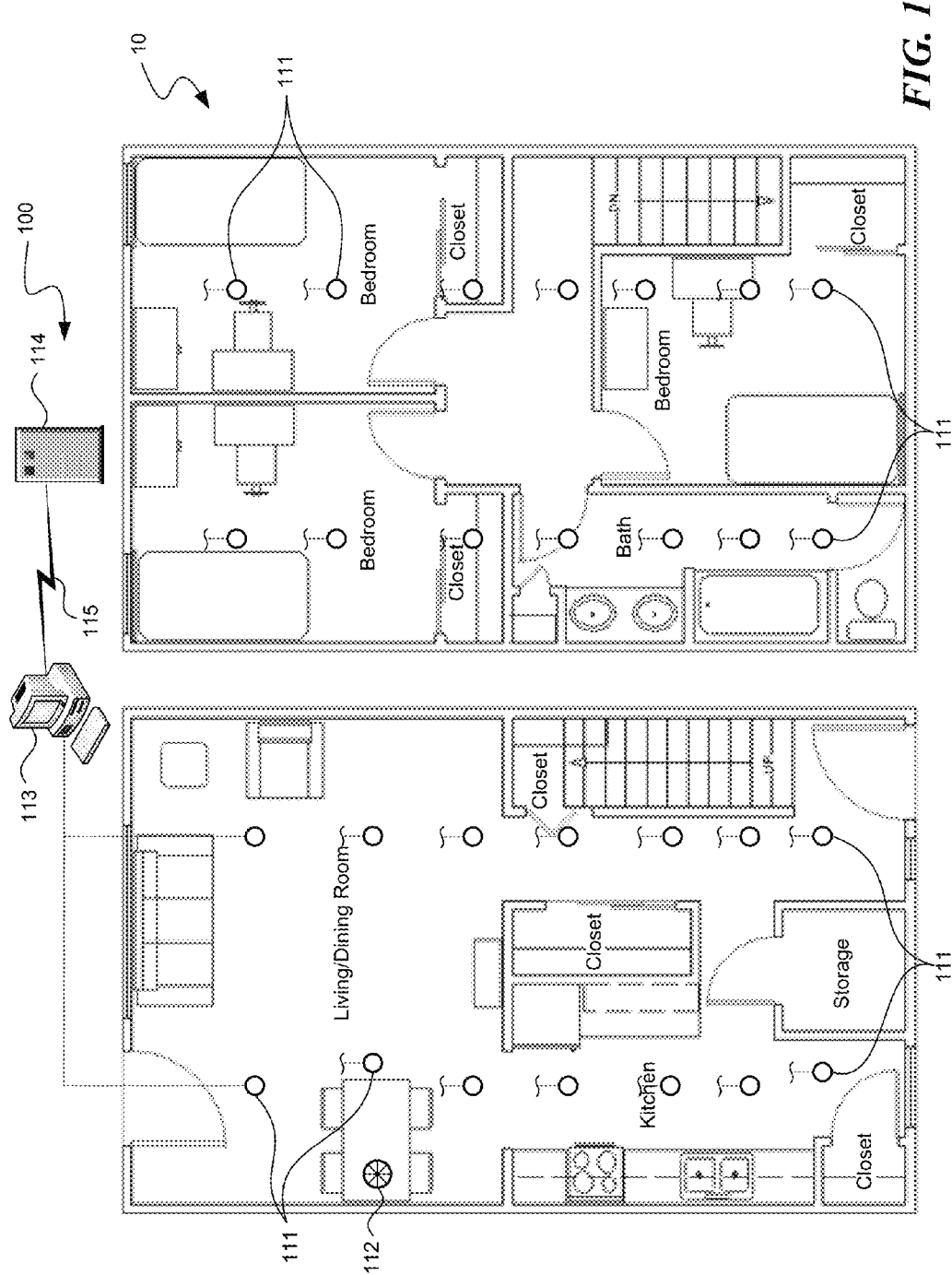
FIG. 1 is a schematic diagram of an automation system suitable for use in a smart environment in accordance with embodiments of the technology.

FIG. 1 is a schematic diagram of an automation system 100 suitable for use in a smart environment 10 in accordance with embodiments of the technology. As shown in FIG. 1, the smart environment 10 includes a three bedroom apartment with sensors 111 and control elements 112 installed therein, a controller 113 operatively coupled to the sensors 111 and the control elements 112, and optionally a server 114 (e.g., a backend network server) coupled to the controller 113 via a network 115 (e.g., an intranet or internet). In other embodiments, the smart environment 10 can also include an office space, a warehouse, and/or other types of environment with additional and/or different electronic and/or mechanical components.

The sensors 111 can include a motion sensor (e.g., ultraviolet light sensors, laser sensors, etc.), a positional sensor (e.g., a position switch on a door, a cabinet, or a refrigerator), an item sensor (e.g., a capacitive sensor for detecting a touch by a user), and/or other suitable types of sensors. The control elements 112 can include a switch (e.g., an electrical switch to turn on a light), an actuator (e.g., an electric actuator to open a door), and/or other types of components capable of being controlled by the controller 113. The sensors 111 and the control elements 112 may be operatively coupled to the controller 113 via wired, wireless, and/or other suitable communication links.

The controller 113 can be configured to recognize activities of a resident in the smart environment 10, and can be configured to automate the operations of the control elements 112 based on the recognized activities (e.g., by turning on a light, opening a door, etc.). The controller 113 can include a personal computer, a programmable logic controller, and/or other types of computing devices. The controller 113 can include a CPU, memory, and a computer-readable storage medium (e.g., a hard drive, a CD-ROM, a DVD-ROM, and/or other types of suitable storage medium) operatively coupled to one another. The computer-readable storage medium can store instructions that may be presented to the CPU for execution. The instructions may include various components described in more detail below with reference to FIG. 2.

Figure 2:
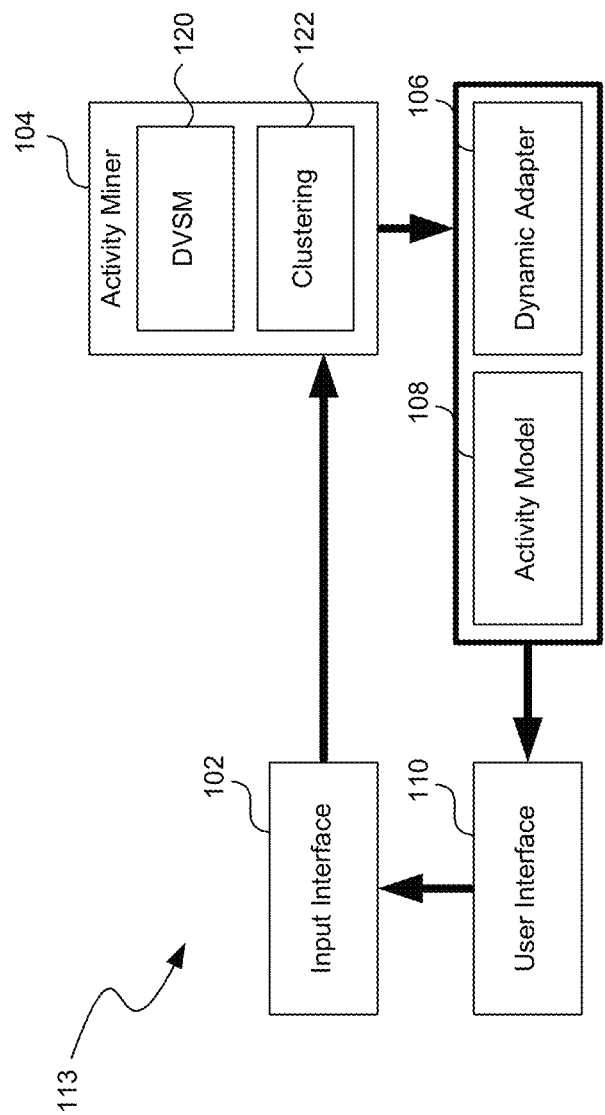
FIG. 2 is a schematic diagram of components of a controller suitable for use in the automation system of FIG. 1 in accordance with embodiments of the technology.

As shown in FIG. 2, the controller 113 can include an input interface 102, an activity miner 104, a dynamic adapter 106, an activity model 108, and a user interface 110 operatively coupled to one another. In certain embodiments, the input interface 102 may include an analog input module, a discrete input module, and/or other suitable hardware components for receiving sensor data. In other embodiments, the input interface 102 may include an Ethernet driver, a USB driver, and/or other suitable software components. In further embodiments, the input interface 102 may include both hardware and software components.

Several embodiments of the activity miner 104, the dynamic adapter 106, the activity model 108, and the user interface 110 are described in greater detail below. In certain embodiments, each of these components may be a computer program, procedure, or process written as source code in a conventional programming language, such as the C++ programming language, and may be presented for execution by the CPU of the controller 113. In other embodiments, some of these components may be implemented as ASIC's, field-programmable gate arrays, and/or other hardware components.

Activity Miner

The activity miner 104 can be configured to analyze collected sensor data from the smart environment 10 (FIG. 1) to discover frequent and periodic activity sequences. Conventional techniques for mining sequential data include mining frequent sequences, mining frequent patterns using regular expressions, constraint-based mining, and frequent-periodic pattern mining. One limitation of these techniques is that they do not discover discontinuous patterns that may indicate a particular resident activity. For example, when a resident prepares a meal, the cooking steps do not always follow the same strict sequence; but rather may change and interleave with other steps that may not consistently appear each time.

Discovering Frequent Discontinuous Sequences

Several embodiments of the activity miner 104 include a Discontinuous Varied-Order Sequential Mining module (DVSM) 120 operatively coupled to a clustering module 122 to identify sensor event sequences that likely belong together and appear with enough frequency and regularity to comprise an activity that can be tracked and analyzed. In other embodiments, the activity miner 104 may also include other suitable modules in addition to or in lieu of the DVSM 120 and the clustering module 122.

The DVSM 120 may be configured to find sequence patterns from discontinuous instances that might also be misplaced (exhibit varied order). For example, the DVSM 120 is configured to extract the pattern <a b> from instances {b×c a}, {a b q}, and {a u b}. The order of items is considered as they occur in the data. Unlike many other sequence mining techniques, a general pattern that comprises all variations of a single pattern that occur in the input dataset D is reported; also reported is the core pattern that is present in all these variations. For a general pattern a, the $i^{th}$ variation of the pattern is denoted as $a_i$, and the core pattern as $a_c$. Each single component of a pattern is referred to as an event (such as "a" in the pattern <a b>).

In accordance with several embodiments, to find discontinuous order-varying sequences from the input data D, a reduced dataset $D_r$ containing all symbols in D that occur with a frequency greater than may be created. To obtain a value for $f_{min}$, the top a % frequent symbols are considered, and $f_{min}$ is set to the minimum frequency from this subset.

Next, a window is moved across $D_r$. The window is initialized to a size of 2 or other suitable values and may be increased by one each iteration. While moving the window across $D_r$, all patterns that are approximate permutations of each another are saved as variations of the same general pattern, e.g., in a hash table. To see if two patterns should be considered as permutations of the same pattern, the Levenshtein distance may be used and an acceptable threshold on this distance, may be imposed. The frequency f(a) of the discovered general pattern a is calculated as a sum of the frequencies of a's order variations. The general pattern a is defined to be the sequence permutation that occurs most often in the dataset.

General patterns may be identified if they satisfy the inequality shown in Equation 1 below. In this equation DL represents the description length of the argument. C is a minimum compression value threshold.

$$\frac{DL(D)}{DL(a)+DL(D \mid a)} > C \qquad (1)$$

The pattern which best describes a dataset is the one which maximally compresses the dataset by replacing instances of the pattern with pointers to the pattern definition. However, because discontinuities are allowed to occur, each instance of the pattern may be encoded not only with a pointer to the pattern definition but also with a discontinuity factor, $\Gamma$. The discontinuity of a pattern instance, $\Gamma(a_i)$, may be calculated as the number of bits required to express how the pattern varies from the general definition.

Figure 3:
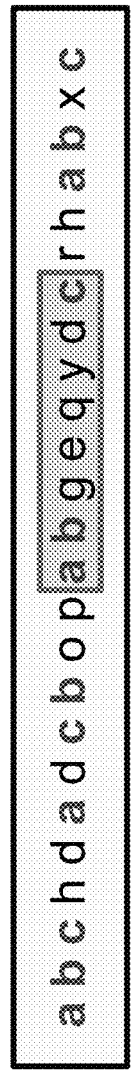
FIG. 3 is a schematic diagram of an example dataset with discontinuous sequences.

FIG. 3 is a schematic diagram of an example dataset for illustrating the foregoing pattern identification technique. As shown in FIG. 3, the dataset includes a general pattern <a b c>. An instance of the pattern is found in the sequence {a b g e q y d c} where symbols "g e q y d" separate the pattern subsequences {a b} and {c}.

The discontinuity of pattern a, referred to as $\Gamma_a$, may be defined as a weighted average of discontinuity variations. The discontinuity of a variation may be defined as the average discontinuity of its instances, which is then weighted by the number of instances of the pattern that occur in the data. Based on this definition of discontinuity, Equation 1 may be rewritten as Equation 2 below:

$$\frac{DL(D)}{(DL(a)+DL(D \mid a)) * \Gamma_a} > C \qquad (2)$$

Patterns that satisfy the inequality in Equation 2 may be flagged as potential candidate patterns. Patterns of increasing length may be identified by increasing the window's size via iteration. During each iteration, in certain embodiments, redundant sub-patterns; i.e., those patterns that are totally contained in another larger core pattern may be eliminated. By eliminating the redundant sub-patterns, the number of discovered patterns may be reduced. In one embodiment, the window size may be increased each iteration until a user-specified number of iterations has been reached. In other embodiments, the window size may be increased each iteration until no more candidate patterns are found.

Clustering Sequences

The activity miner 104 can also include a clustering module 122 configured to group patterns that represent particular activities and their instances. For example, the clustering module 122 can group the set of discovered patterns, P, into a set of clusters, A. The resulting sets of clusters represent the activities that may be modeled, recognized, and tracked. In one embodiment, the clustering module 122 can use a standard k-means clustering technique. In other embodiments, the clustering module 122 can also use hierarchical clustering that is either agglomerative (bottom up) or divisive (top down) and/or other suitable techniques.

In certain embodiments, patterns discovered by the DVSM 120 can include sensor events. In one embodiment, the clustering module 122 considers the pattern as composed of states. States may correspond to the pattern events but can also include additional information such as the type and duration of the sensor events. In addition, several states may be combined to form a new state. For example, consecutive states with sensors of the same type may be combined to form a new state in order to have a more compact representation of activities and/or to allow similar activities to be more easily compared.

To calculate the similarity between two activities x and y, the clustering module 122 may compute the edit distance between the activity sequences, or the sequence of steps that comprise the activity. In particular, the number of edit operations that are required to make activity x equal to activity y may be computed. The weighted edit operations may include adding a step, deleting a step, re-ordering a step, or changing the attributes of a step (i.e., step duration).

A representative cluster may be defined as the activity that has the highest degree of similarity with all other activities in the same cluster, or equivalently the lowest combined edit distance to all other activities in the cluster. Each representative cluster represents a class of similar activities, considerably forming a compact representation of all the activities in the cluster. The activities represented by the final set of clusters are those that are modeled and recognized by the automation system 100 (FIG. 1).

Activity Model

The activity model 108 can then build models for the sequences that provide a basis for learning automation policies. Several embodiments of the activity model 108 are configured to model smart environmental activities and sequences reported by the activity miner 104 and then to use the model to identify activities that may be automated (e.g., by controlling the control elements 112 in FIG. 1) and/or monitored. A range of different probabilistic models may be used in the activity model 108. Suitable examples include Dynamic Bayes Networks, Naïve Bayes Classifiers, Markov models, and hidden Markov models.

A great deal of variation may exist in the manner in which the activities are performed. This variation is increased dramatically when the model used to recognize the activity needs to generalize over more than one possible resident. To address such difficulty, in several embodiments, the activity model 108 includes a hidden Markov model to determine an activity that most likely corresponds to an observed sequence of sensor events.

A hidden Markov model (HMM) is a statistical model in which the underlying model is a stochastic process that is not observable (i.e. hidden) and is assumed to be a Markov process which can be observed through another set of stochastic processes that produce the sequence of observed symbols (or sensor data). A HMM assigns probability values over a potentially infinite number of sequences. Because the probability values must sum to one, the distribution described by the HMM is constrained. Thus, the increase in probability values of one sequence is directly related to the decrease in probability values for another sequence.

Given a set of training data, the activity model 108 uses the sensor values as parameters of a hidden Markov model. Given an input sequence of sensor event observations, the hidden Markov model may be used to find the most likely sequence of hidden states, or activities, which could have generated the observed event sequence. While a skilled artisan could use both forward and backward probability calculations, in the illustrated embodiment, Equation (3) below may be used to identify this sequence of hidden states:

$$\arg\max_{x_1 \ldots x_t} P(y_1, \ldots, y_t, y_{t+1} | x_{1:t+1}) \qquad (3)$$

The activity model 108 can recognize interleaved activities using HMM's. The conditional probability distribution of any hidden state depends only on the value of the preceding hidden state. The value of an observable state depends only on the value of the current hidden state. The observable variable at time t, namely $x_t$, depends only on the hidden variable $y_t$ at that time. In certain embodiments, a HMM may use three probability distributions: the distribution over initial states $\Pi=\{\pi_k\}$, the state transition probability distribution $A=\{a_{kl}\}$, with $a_{kl}=p(y_t=l|y_{t-1}=k)$ representing the probability of transitioning from state k to state l; and the observation distribution $B=\{b_{il}\}$, with $b_{il}=p(x_t=i|y_t=l)$ indicating the probability that the state l would generate observation $x_t=i$. These distributions may be estimated based on the relative frequencies of visited states and state transitions observed in a training period.

The activity model 108 may be configured to identify the sequence of activities (i.e., the sequence of visited hidden states) that corresponds to a sequence of sensor events (i.e., the observable states). The activity model 108 can calculate based on the collected data, the prior probability (i.e., the start probability) of every state which represents the probability of which state the HMM is in when the first sensor event is detected. For a state (or activity) a, this is calculated as the ratio of instances for which the activity label is a.

The activity model 108 may also calculate the transition probability which represents the change of the state in the underlying Markov model. For any two states a and b, the probability of transitioning from state a to state b is calculated as the ratio of instances having activity label a followed by activity label b, to the total number of instances. The transition probability signifies the likelihood of transitioning from a given state to any other state in the model and captures the temporal relationship between the states. Lastly, the emission probability represents the likelihood of observing a particular sensor event for a given activity. This may be calculated by finding the frequency of every sensor event as observed for each activity.

Figure 4:
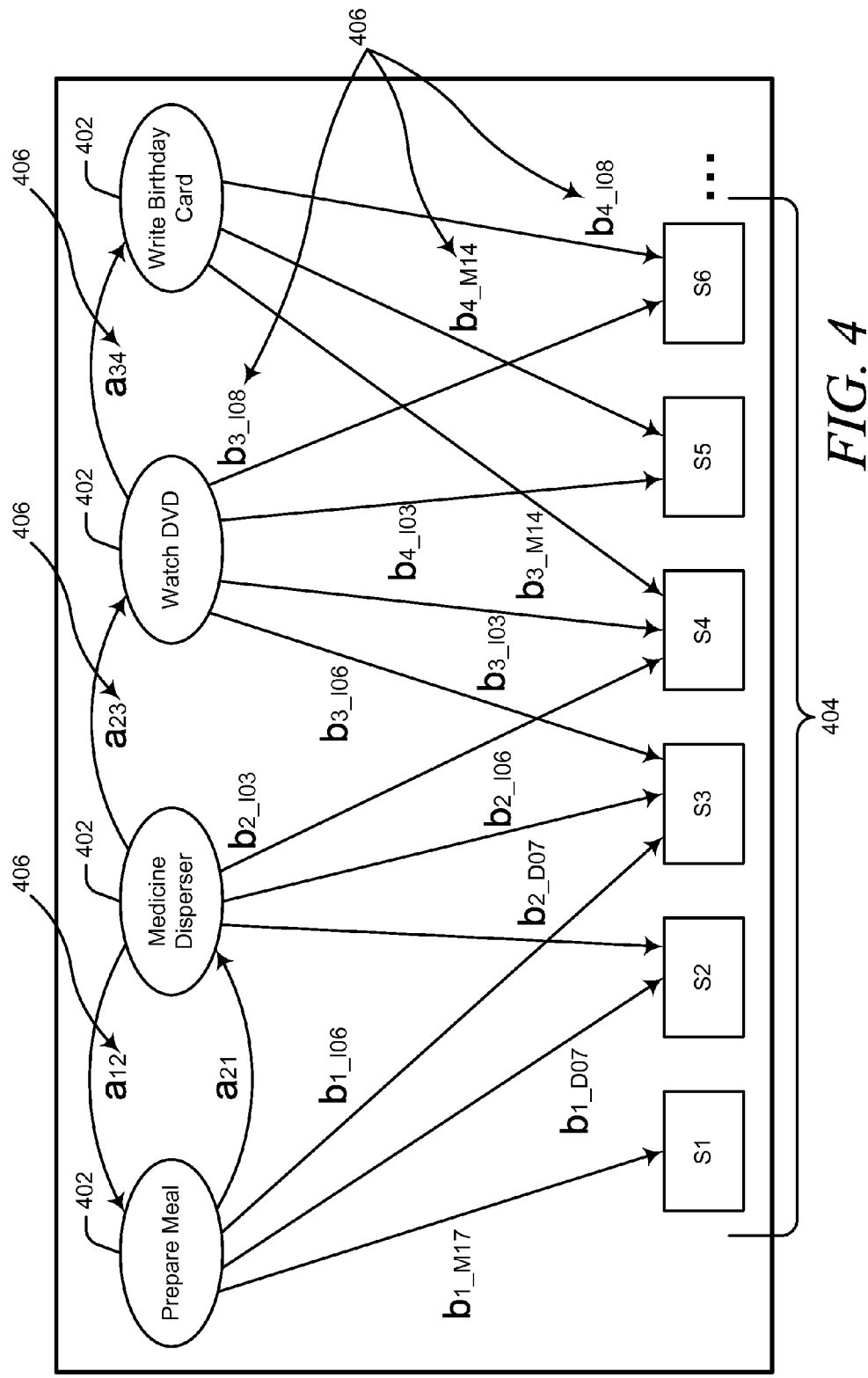
FIG. 4 is a schematic diagram illustrating an example of interleaved activity data.

FIG. 4 shows a portion of an example of a generated HMM for multi-resident activities. As shown in FIG. 4, the HMM can include hidden nodes 402 (associated with a particular resident activity) associated with one another and with sensor events 404 via a plurality of corresponding probabilities 406. For example, the hidden node 402 "Prepare Meal" is associated with another hidden node 402 "Medicine Disperser" via a probability a21 that may be obtained empirically from training data. The probability a21 represents the probability of the resident transitioning from "Prepare Meal" to "Medicine Disperser" when the current state is "Prepare Meal." The hidden node 402 "Prepare Meal" can also be associated with a sensor event S1 (e.g., a motion sensor) via a probability $b_{1\_M17}$. The probability $b_{1\_M17}$ represents the probability that the sensor event (i.e., motion detection at S1) is caused by the resident's activity of "Prepare Meal."

Selecting Actions for Automation

After the activity model is constructed, in several embodiments, the activity model 108 optionally schedules activities for automation such that 1) the most-predicted activities are given a greater chance of being automated, 2) less likely activities retain a chance of being automated, and 3) the temporal relationships between activities are preserved (i.e., activities are scheduled as a maximal non-conflicting set of actions).

The probability of selecting a particular activity A for automation is thus calculated as shown in Equation 4, where k is a constant and $\beta*D(A)$ is a term which is added to favor recently added sequences.

$$P(A) = \frac{k^{EU(A)+\beta*D(A)}}{\sum_j k^{E(j)+\beta*D(j)}} \quad (4)$$

The initial value of k can be relatively high which allows for exploration, but over time may decrease so that the automation becomes more predictable as the desirability of the activities is established.

In certain embodiments, the activity model 108 may optionally select activities for automation according to their expected utility. At any given time, the automation system 100 may select an event to perform and maximizes the expected utility based on the feedback the resident has provided for the automated sequences using the formula shown in Equation 5:

$$EU(A) = P_T(A)\overline{Q}(A) \quad (5)$$

In Equation 4, the value $\overline{Q}(A)$ of activity A is defined as the average of the values for all of the events comprising the activity. The probability $P_T(A)$ represents the probability of transitioning to activity A.

Dynamic Adaptation

The dynamic adapter 106 can be configured to detect changes in resident behaviors and modify the automation policies. In several embodiments, the dynamic adapter 106 may adapt in four ways. First, a resident can modify, delete, or add automation activities using the user interface 110. Second, the resident can rate automation activities based on their preferences. Third, the resident can highlight an activity in the user interface 110 for observation, and allow the automation system 100 to automatically detect changes and modify the model for that activity. Finally, the dynamic adapter 106 can passively monitor resident activities and if a significant change in events occurs may automatically update the corresponding activity model. In other embodiments, the automation system 100 can also adapt in other ways and/or a combination of the foregoing adaptation approaches.

In several embodiments, the automation system 100 provides an option to automatically detect changes in a specified activity to remove the burden of explicit user manipulation. When an activity is highlighted for monitoring, several embodiments of the dynamic adapter 106 can collect event data and mine the sequences, as was initially done by the activity miner 104. The activity miner 104 can be looking for potentially-changed versions of a specific activity. These changes may include new activity start times, durations, triggers, periods, or structure. Structure change can be detected by finding new patterns of activity that occur during the times that the automation system 100 expects the old activity to occur. Other parameter values may be changed if an activity occurs that matches the structure of the highlighted activity but the parameters (e.g., timing, triggers) have changed. All changes above a given threshold may be considered as different versions of the pattern and may be shown to the user through the user interface 110.

In addition, the dynamic adapter 106 can automatically mine collected data at periodic intervals (e.g., every three weeks) to update the activity models. New and revised activities are reflected in the activity models using update procedures similar to the ones that were already described. For activities that are already in the activity model, a decay function, shown in Equation 6, may be applied that reduces the value of an activity by a small amount $\epsilon$ at each step $\theta$.

$$Q_i^{\pi} - Q_i^{\pi} - \frac{\varepsilon * \Delta t_d}{\theta} \quad (6)$$

The decay effect allows activities that have not been observed over a longer period of time to receive smaller values and eventually to be forgotten.

User Interface

Users can explicitly request automation changes through the user interface 110. In several embodiments, the user interface 110 can be a discrete event simulator where each object is a self-descriptive, iconic representation of an item in the environment. Using data collected from motion sensors 110, the controller 113 can display the resident's location, visualized as animated footprints on the map. Several types of objects in the environment include: static, dynamic and interface. While static object states do not change, dynamic objects can change state. Interface objects allow either users or other external entities to interact with the simulation. Each object possesses attributes, a number of possible states, and a specific functionality.

The user interface 110 allows the resident to control events that are distributed across time as well as the resident's living space. The user interface 110 may be configured to create a temporal framework and spatial framework to allow the resident to perceive, comprehend, and ultimately modify events occurring in the physical world around the resident. In such a schema, the floor map provides a spatial framework and the temporal constraints are displayed as an animation of event sequences where the direct mapping of the order of events in the physical world maps to the order of the displayed elements.

EXAMPLES

Example 1

Activity Miner

Several embodiments of the automation system 100 were evaluated using generated data and data collected in a three-bedroom apartment generally similar to that shown in FIG. 1. The apartment was equipped with motion sensors on the ceiling approximately 1 meter apart throughout the space. In addition, sensors were installed to provide ambient temperature readings and readings for hot water, cold water, and stove burner use. Voice over IP using the Asterisk software captured phone usage. Contact switch sensors monitored the open/closed status of doors and cabinets, and pressure sensors monitored usage of key items such as the medicine container, cooking phone, and phone book. Sensor data were captured using a sensor network and stored in a SQL database. Middleware using a jabber-based publish/subscribe protocol as a lightweight platform and language-independent middleware were used to push data to client tools.

Normal Activity Discovery

For the first experiment, the activity miner 104 was applied to data collected in the apartment. Specifically, data for a collection of specific, scripted activities were collected and analyzed using the activity miner 104. To provide physical training data, 24 Washington State University undergraduate students were recruited from the psychology subject pool into the apartment. One at a time, the students performed the following five activities:

1) Telephone Use: Looked up a specified number in a phone book, called the number, and wrote down the cooking directions given on the recorded message.
2) Hand Washing: Washed hands in the kitchen sink.
3) Meal Preparation: Cooked oatmeal on the stove according to the recorded directions, added brown sugar and raisins (from the kitchen cabinet) once done.
4) Eating and Medication Use: ate the oatmeal together with a glass of water and medicine (a piece of candy).
5) Cleaning: Cleaned and put away the dishes and ingredients.

Figure 5:
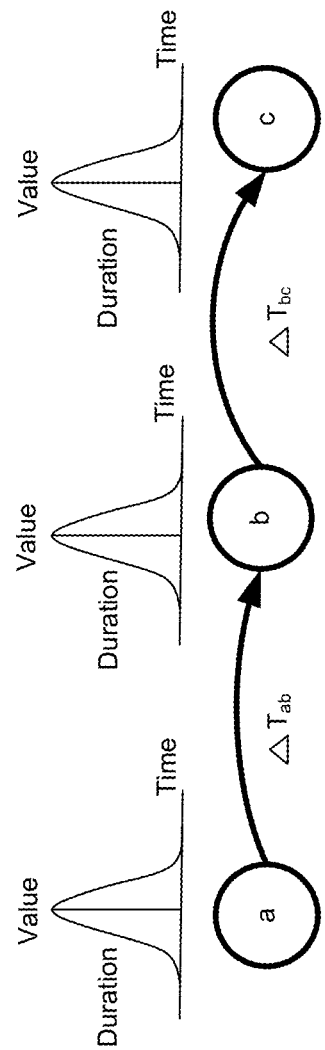
FIG. 5 is a schematic diagram of an example of sensor states in accordance with embodiments of the technology.

FIG. 5 is a schematic diagram of an example of sensor states in accordance with embodiments of the technology. As shown in FIG. 5, sensor states a, b, and c with their corresponding value distributions are recorded. Also recorded is the elapsed time between two states. For example, a first elapsed time $\Delta T_{ab}$ between state a and state b and a second elapsed time $\Delta T_{ac}$ between state b and state c. In certain embodiments, the elapsed time may be used to recognize different activities when the activities involve similar or the same sequence of sensor events. For example, a sensor event may indicate a faucet is opened. The elapsed time may be used to identify whether a resident is washing hands or washing dishes because washing dishes would typically involve a longer elapsed time.

The activity miner 104 was applied to the sensor data collected for the normal activities. Specifically, repeating sequential patterns were discovered in the sensor event data and then clustered into five clusters and determined if the discovered activities were similar to those that were pre-defined to exist in the sensor data. In these experiments, the minimum compression threshold, C, was set to 0.3, the minimum symbol frequency, fmin, was set to 2, and the permutation threshold, S, was set to 0.5. When analyzing all collected sensor events, DVSM 120 discovered 21 general patterns with lengths varying from 7 to 33 events, and comprising up to 4 variations for each pattern. The DVSM 120 was able to find repetitive patterns in a compact form from 120 activity sensor streams, despite considerable intra-subject variability.

Next, the discovered activities can be clustered. The attributes considered in this set of activities were duration of states and frequency. Averaging over 10 runs, the activity miner 104 found cluster representatives corresponding to the original activities for 76% of the participant data files with a standard deviation of 12.6% (discovering 100% for some participants). In addition, 77.1% of the total activity sensor event sequences were assigned to the correct clusters (with a standard deviation of 4.8%).

Interweaved Activity Discovery

In the second experiment, the activities were interwoven together when performed. The activity miner 104 was still able to discover many of these pre-selected activities. Twenty two additional volunteer participants were recruited to perform a series of activities in the apartment, one at a time:

1) Fill medication dispenser: Here the participant removed the items from the kitchen cupboard and filled the medication dispenser using the space on the kitchen counter.
2) Watch DVD: The participant selected the DVD labeled "Good Morning America" located on the shelf below the TV and watched it on the TV. After watching it, the participant turned off the TV and returned the DVD to the shelf.
3) Water plants: For this activity, the participant took the watering can from the supply closet and lightly watered the 3 apartment plants, 2 of which were located on the kitchen windowsill and the third was located on the living room table. After finishing, he/she emptied any extra water from the watering can into the sink and returned the watering can to the supply closet.
4) Converse on Phone: Here the participant answered the phone when it rang and hung up after finishing the conversation. The conversation included several questions about the DVD show that the participant watched as part of activity 2.
5) Write Birthday Card: The participant wrote a birthday wish inside the birthday card and filled out a check in a suitable amount for a birthday gift, using the supplies located on the dining room table. He/she then placed the card and the check in an envelope and appropriately addressed the envelope.
6) Prepare meal: The participant used the supplies located in the kitchen cupboard to prepare a cup of noodle soup according to the directions on the cup of noodle soup. He/she also filled a glass with water using the pitcher of water located on the top shelf of the refrigerator.
7) Sweep and dust: For this task, the participant swept the kitchen floor and dusted the dining and the living room using the supplies located in the kitchen closet.
8) Select an outfit: Lastly, the participant selected an outfit from the clothes closet to be worn by a male friend going on an important job interview. He/she then laid out the selected clothes on the living room couch.

The participants performed all of the foregoing activities by interweaving them in any fashion they liked with a goal of being efficient in performing the tasks. The order in which activities were performed and were interwoven was left to the discretion of the participant. Because different participants interwove the tasks differently, the resulting data set was rich and complex.

Similar to the previous experiment, the DVSM 120 was run on the data containing 176 activities, and then clustered the discovered patterns. The parameter values were defined as in the previous experiment, with the exception that the number of clusters was set to 8 to be equal to the new number of pre-defined activities. When it was applied to the collected sensor data, DVSM 120 was able to find 32 general patterns with lengths varying from 6 to 45 events, and comprising up to 8 activity variations. Averaging over 10 runs, the activity miner 104 found cluster representatives corresponding to the original activities in 87.5% of the participant datasets. Surprisingly, this number is higher than in the previous experiment. From the dataset, 92.8% of the activity sensor event sequences were assigned to the correct clusters.

Long Term Activity Discovery

A possible use of the present technology is to perform activity discovery during a time when a resident is healthy and functionally independent, to establish a baseline of normal daily activities. In a third experiment, three months of daily activity data from the smart apartment 10 were collected while two residents lived there and performed their normal daily routines. Sensor data were collected continuously, resulting in 987,176 sensor events. The activity miner 104 was applied to the first month of collected data. The parameter settings were similar to the previous experiments with the exceptions that the maximum sequence length was set to 15, and the top percentage (a) of frequent symbols was varied in pattern discovery.

Figure 6:
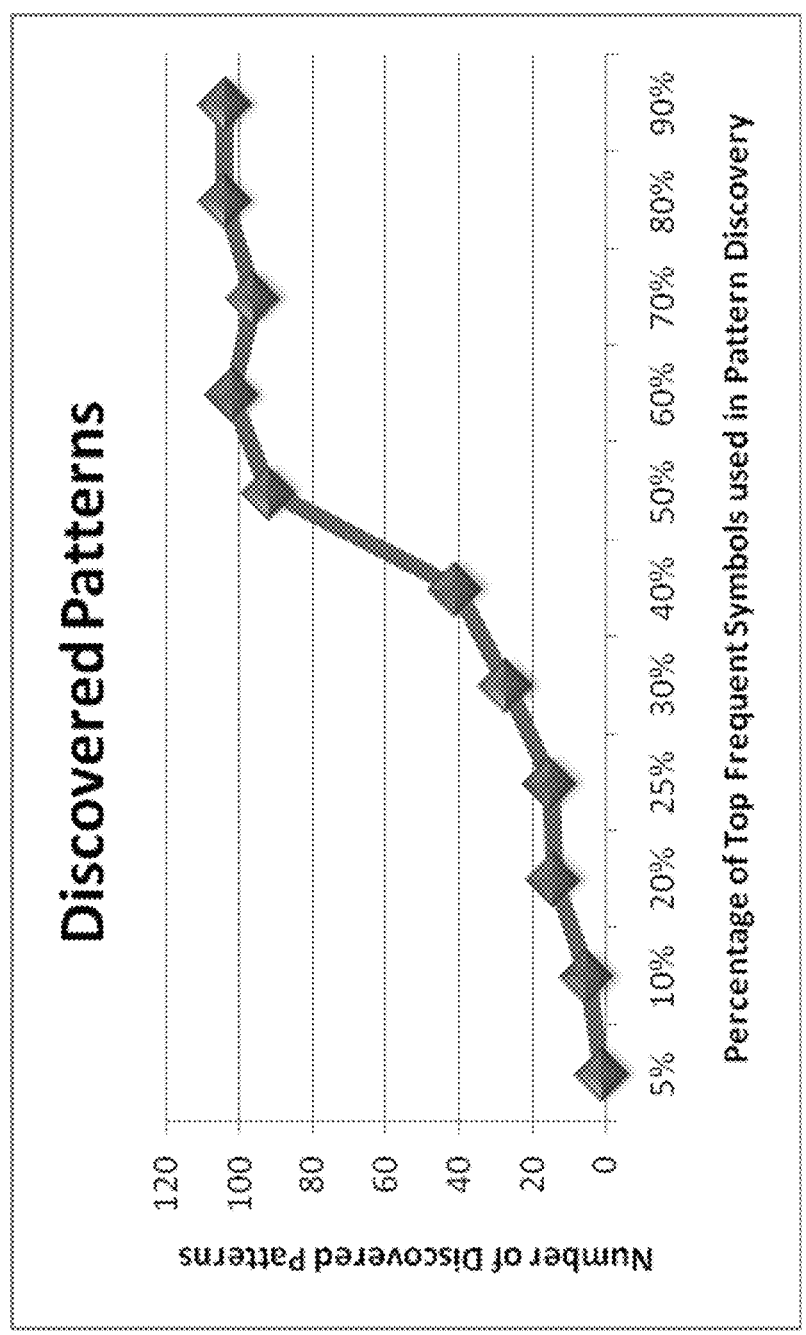
FIG. 6 is a diagram of an example of number of discovered patterns versus percentage of top frequent symbols.
Figure 7:
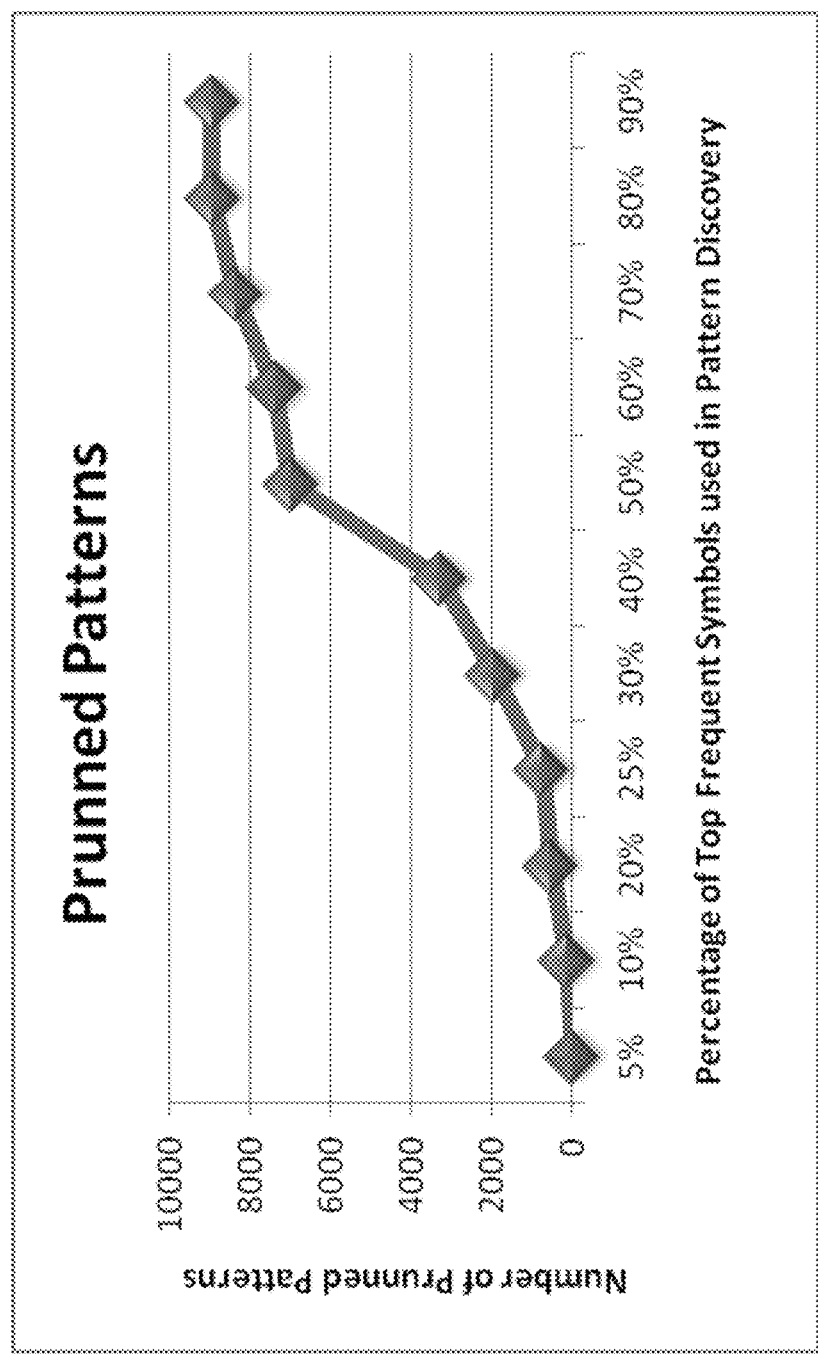
FIG. 7 is a diagram of an example of number of pruned patterns versus percentage of top frequent symbols.

It is believed that increasing the value of a results in discovering more patterns, as a wider range of frequent symbols are involved, but after the value exceeds a certain threshold (in our experiments 50%), fewer new patterns are discovered. As FIG. 6 shows, the number of patterns ranged from 2 ($\alpha$=5%) to 110 ($\alpha$=60%). As shown in FIG. 7, the pruning process removed a large number of patterns, considerably reducing the number of redundant patterns.

Figure 8:
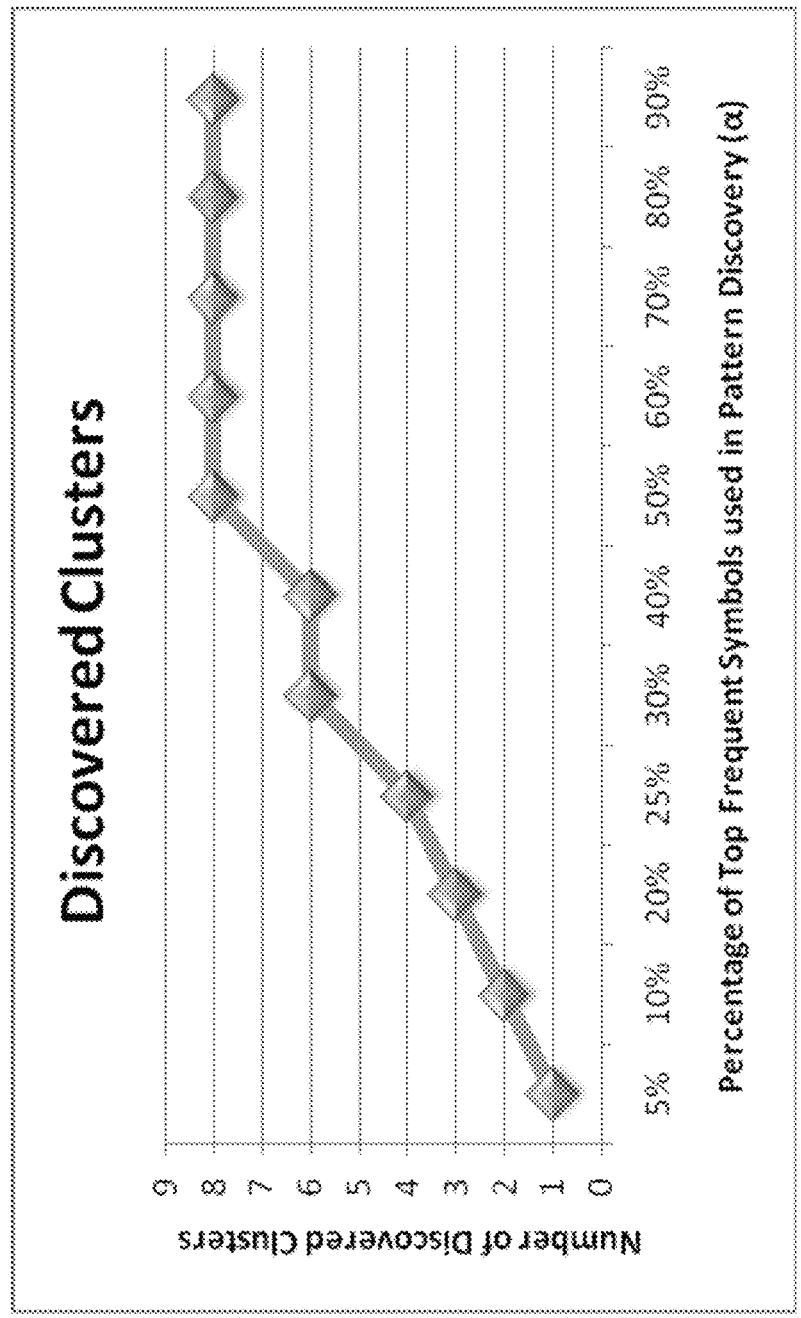
FIG. 8 is a diagram of an example of number of discovered clusters versus percentage of top frequent symbols.

As shown in FIG. 8, after discovering sequential patterns in the sensor event data, the discovered patterns were clustered, with k set to a maximum of 8 clusters. For smaller values of $\alpha$, the clusters tend to merge together. As the value of $\alpha$ increases and therefore the number of discovered patterns increase, more distinguished clusters were formed. After a threshold value of $\alpha$ was reached ($\alpha$=50%), the number of clusters remained virtually constant.

Example 2

Activity Models

HMM and Naïve Bayes Classifier 20 volunteer participants were recruited to perform the foregoing series of activities in the smart apartment, one at a time. Each participant first performed the separated activities in the same sequential order. Then, the participants performed all of the activities again while interweaving them in any fashion.

The data collected during these tasks were manually annotated with the corresponding activity for model training purposes. Specifically, each sensor event was labeled with the corresponding activity ID. The average times taken by the participants to complete the eight activities were 3.5 minutes, 7 minutes, 1.5 minutes, 2 minutes, 4 minutes, 5.5 minutes, 4 minutes and 1.5 minutes, respectively. The average number of sensor events collected for each activity was 31, 59, 71, 31, 56, 96, 118, and 34, respectively.

Figure 9:
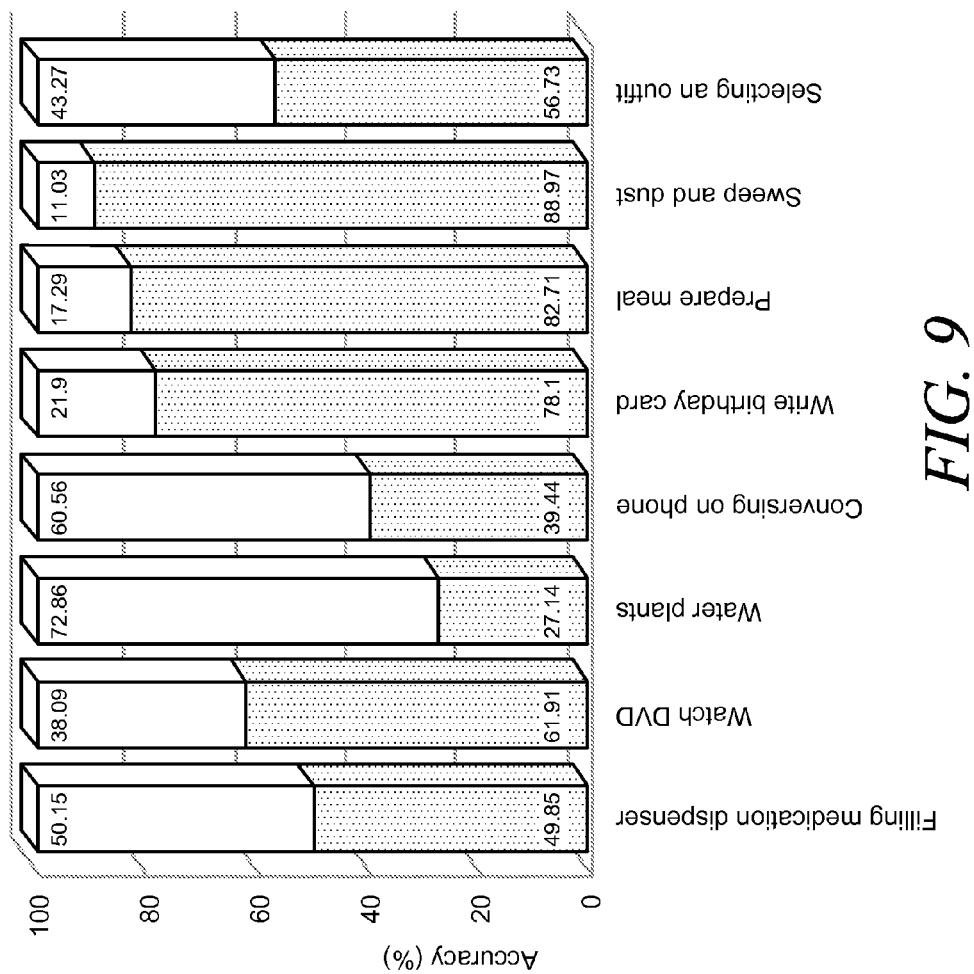
FIG. 9 is a bar graph illustrating an example of performance of naive Bayes classifier by activity category.
Figure 10:
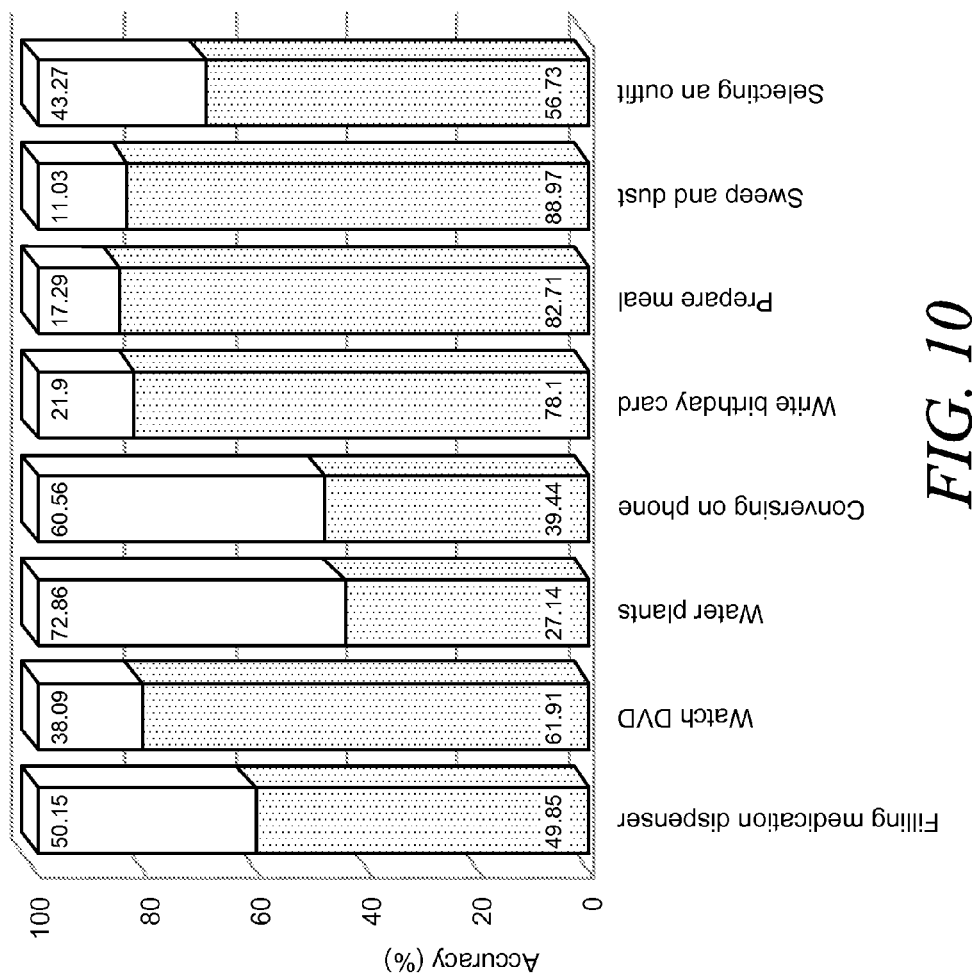
FIG. 10 is a bar graph illustrating an example of hidden Markov model by activity category.

The data collected were used to train a naïve Bayes classifier and HMM. The naïve Bayes classifier achieved an average recognition accuracy of 66.08% as shown in FIG. 9. The HMM achieved an average recognition accuracy of 71.01%, which represents a significant improvement of 5% accuracy over the naïve Bayes model at p<0.04, as shown in FIG. 10.

Figure 11:
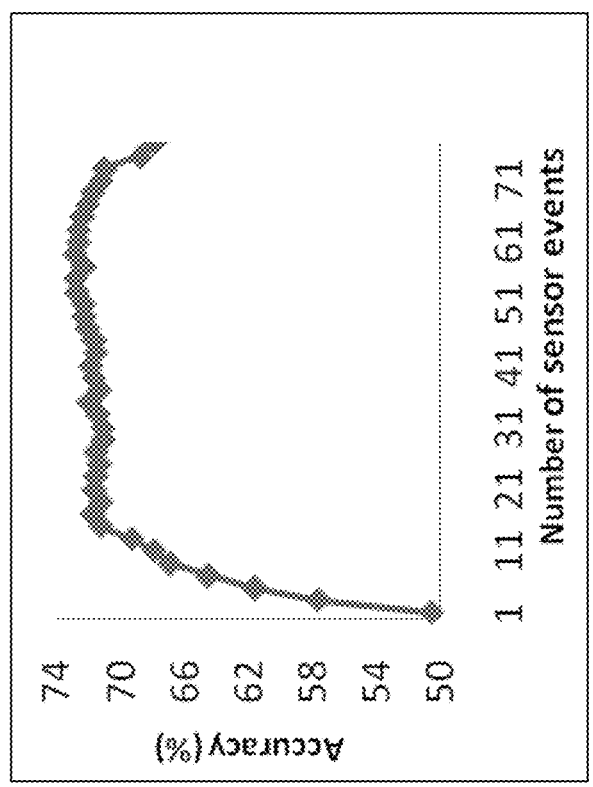
FIG. 11 is a graph of an example of model accuracy versus number of sensor events.

FIG. 11 shows the accuracy of the HMM for various count-based window sizes. The performance of the HMM improves as the window size increases. Performance peaks at a window size of 57 sensor events, which was the size that the activity miner used for the activity recognition. Performance starts falling again when the window size was too large.

Figure 12:
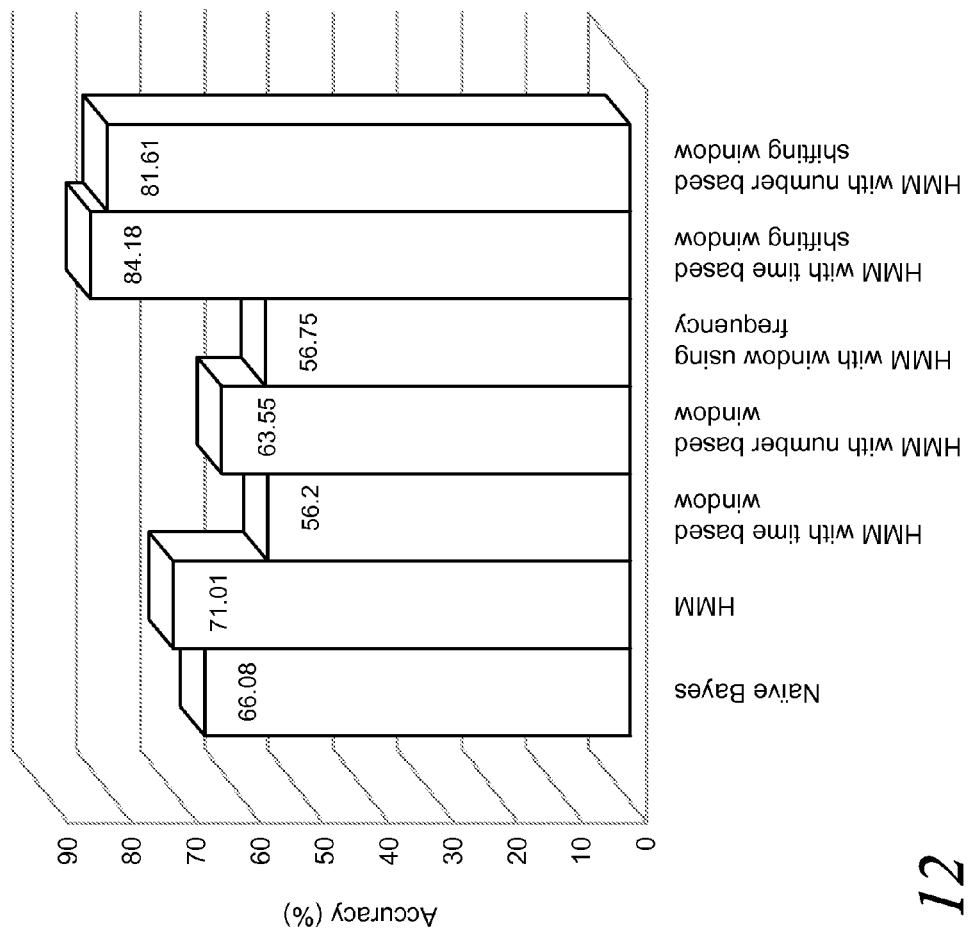
FIG. 12 is a bar graph illustrating performance comparison of several techniques for recognizing interleaved activities.

In addition to applying a moving window, the activity labeling approach was also changed. Instead of labeling each sensor event with the most probable activity label, the activity label for the entire window was determined. Then, the last sensor event in the window was labeled with the activity label that appears most often in the window (a frequency approach) and the window was moved down the stream by one event to label the next event. Alternatively, all sensor events in the window may be labeled with the activity label that most strongly supports the sequence and then the window may be shifted to cover a non-overlapping set of new sensor events in the stream (a shifting window approach). FIG. 12 compares the performance of the foregoing techniques.

HMM with Multiple Residents 40 volunteer participants were recruited to perform a series of activities in the smart apartment. The smart apartment was occupied by two volunteers at a time performing the assigned tasks concurrently. The collected sensor events were manually labeled with the activity ID and the person ID. For this study, 15 activities were selected:

Person A:
1. Filling medication dispenser (individual): for this task, the participant worked at the kitchen counter to fill a medication dispenser with medicine stored in bottles.
2. Moving furniture (cooperative): When Person A was requested for help by Person B, (s)he went to the living room to assist Person B with moving furniture. The participant returned to the medication dispenser task after helping Person B.
3. Watering plants (individual): The participant watered plans in the living room using the watering can located in the hallway closet.
4. Playing checkers (cooperative): The participant brought a checkers game to the dining table and played the game with Person B.
5. Preparing dinner (individual): The participant set out ingredients for dinner on the kitchen counter using the ingredients located in the kitchen cupboard.
6. Reading magazine (individual): The participant read a magazine while sitting in the living room. When Person B asked for help, Person A went to Person B to help locate and dial a phone number. After helping Person B, Person A returned to the living room and continued reading.
7. Gathering and packing picnic food (individual): The participant gathered five appropriate items from the kitchen cupboard and packed them in a picnic basket. (S)he helped Person B to find dishes when asked for help. After the packing was done, the participant brought the picnic basket to the front door.

Person B:
1. Hanging up clothes (individual): The participant hung up clothes that were laid out on the living room couch, using the closet located in the hallway.
2. Moving furniture (cooperative): The participant moved the couch to the other side of the living room. (S)he requested help from Person A in moving the couch. The person then (without or without the help of Person A) moved the coffee table to the other side of the living room as well.
3. Reading magazine (individual): The participant sat on the couch and read the magazine located on the coffee table.
4. Sweeping floor (individual): The participant fetched the broom and the dust pan from the kitchen closet and used them to sweep the kitchen floor.
5. Playing checkers (cooperative): The participant joined Person A in playing checkers at the dining room table.
6. Setting the table (individual): The participant set the dining room table using dishes located in the kitchen cabinet.
7. Paying bills (cooperative): The participant retrieved a check, pen, and envelope from the cabinet under the television. (S)he then tried to look up a number for a utility company in the phone book but later asked Person A for help in finding and dialing the number. After being helped, the participant listened to the recording to find out a bill balance and address for the company. (S)he filled out a check to pay the bill, put the check in the envelope, addressed the envelope accordingly and placed it in the outgoing mail slot.

8. Gathering and packing picnic supplies (cooperative): The participant retrieved a Frisbee and picnic basket from the hallway closet and dishes from the kitchen cabinet and then packed the picnic basket with these items. The participant requested help from Person A to locate the dishes to pack.

The average activity time and number of sensor events generated for each activity are shown in the table below:

| Activity | Person A time | Person A #events | Person B time | Person B #events |
|---|---|---|---|---|
| 1 | 3.0 | 47 | 1.5 | 55 |
| 2 | 0.7 | 33 | 0.5 | 23 |
| 3 | 2.5 | 61 | 1.0 | 18 |
| 4 | 3.5 | 38 | 2.0 | 72 |
| 5 | 1.5 | 41 | 2.0 | 25 |
| 6 | 4.5 | 64 | 1.0 | 32 |
| 7 | 1.5 | 37 | 5.0 | 65 |
| 8 | N/A | N/A | 3.0 | 38 |

Figure 13:
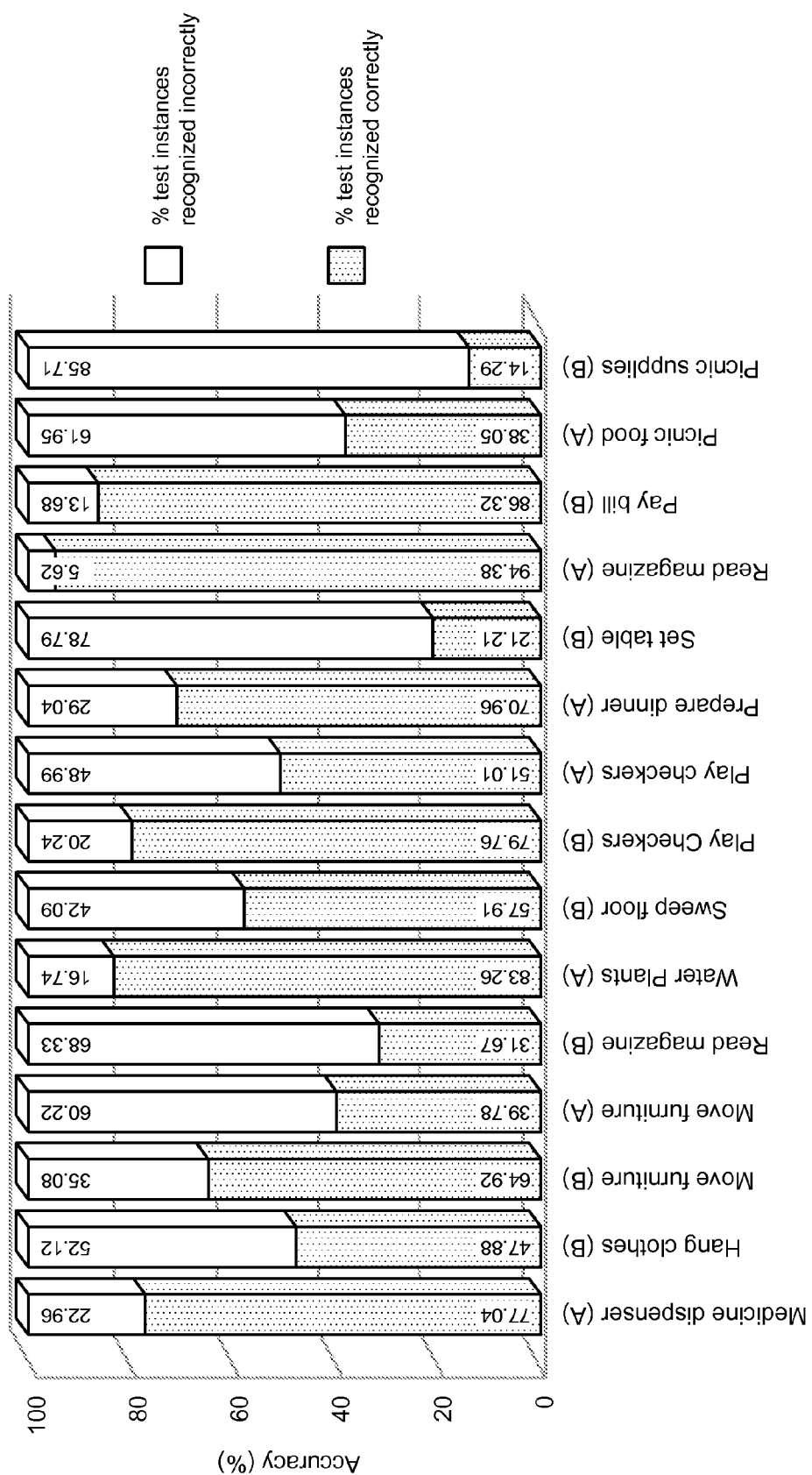
FIG. 13 is a bar graph illustrating an example of performance of a hidden Markov model in recognizing activities for multi-resident data.

Initially, all of the sensor data for the 15 activities were included in one dataset and the labeling accuracy of the HMM was evaluated using 3-fold cross validation. The HMM recognized both the person and the activity with an average accuracy of 60.60%, higher than the expected random-guess accuracy of 7.00%. FIG. 13 shows the accuracy of the HMM by activity. As shown in FIG. 13, those activities that took more time and generated more sensor events (e.g., Read magazine A, 94.38% accuracy) tend to be recognized with greater accuracy. The activities that are very quick (e.g., Set table B, 21.21% accuracy) did not generate enough sensor events to be distinguished from other activities and thus yielded lower recognition results.

Separating Models for Residents

Figure 14:
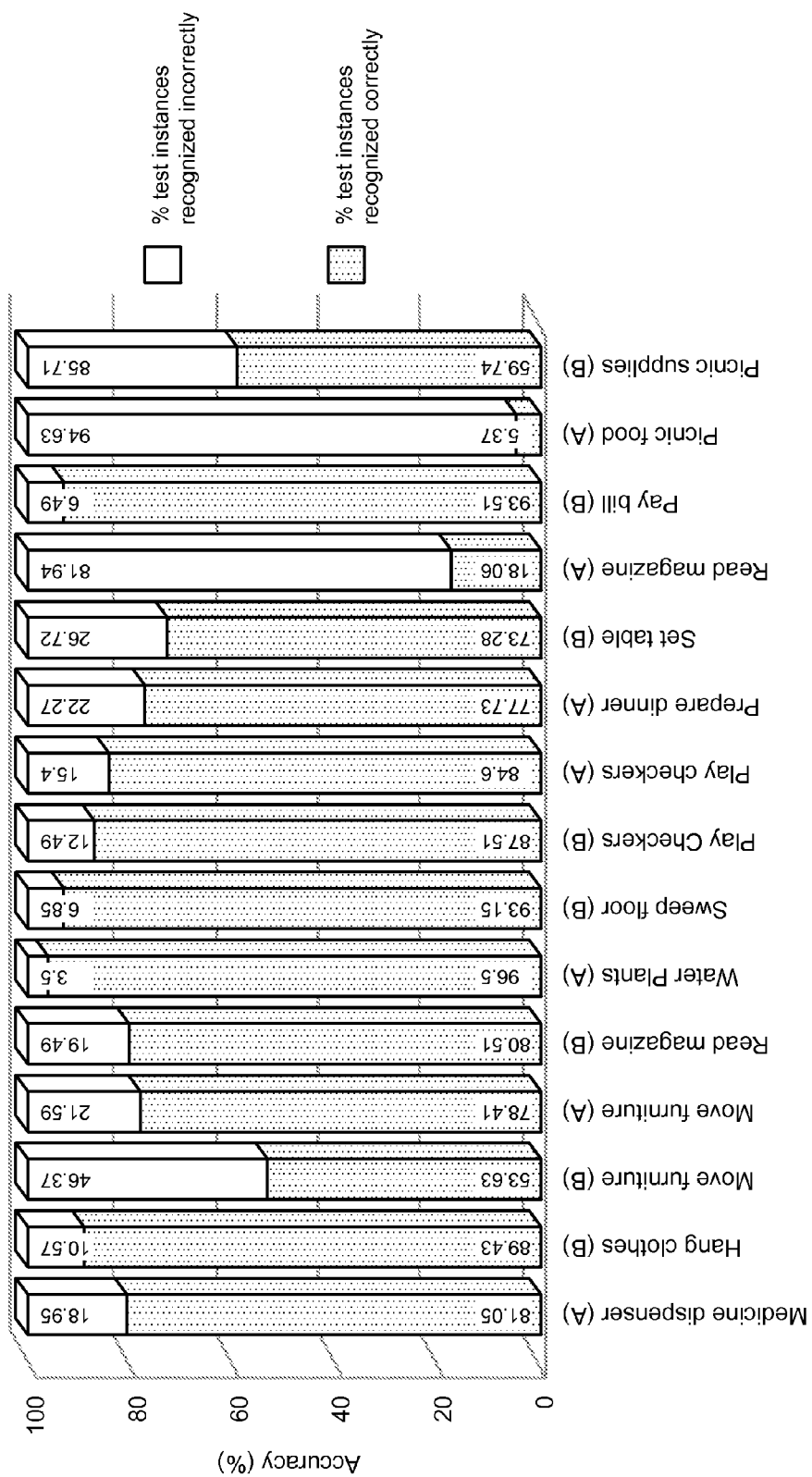
FIG. 14 is a bar graph illustrating an example of performance of a hidden Markov model in recognizing activities for each resident.

Instead of having one HMM representing multiple residents, one HMM was generated for each of the residents in further experiments. Each of the models contains one hidden node for each activity and observable nodes for the sensor values. The sensor data were collected from the combined multiple-resident apartment where the residents were performing activities in parallel. The average accuracy of the new model is 73.15%, as shown in FIG. 14.

From the foregoing, it will be appreciated that specific embodiments of the disclosure have been described herein for purposes of illustration, but that various modifications may be made without deviating from the disclosure. Certain aspects of the disclosure described in the context of particular embodiments may be combined or eliminated in other embodiments. Not all embodiments need necessarily exhibit such advantages to fall within the scope of the disclosure. The following examples provide additional embodiments of the disclosure.

We claim:

1. A computer implemented method, comprising:
a processor collecting input data from a plurality of sensors in a space, the input data including a plurality of sequential data points corresponding to the individual sensors, wherein each data point represents a sensor event;
a processor analyzing the input data received from the plurality of sensors to determine a sequence pattern of data points from the input data, an instance of the sequence pattern of data points being at least partially discontinuous; and
a processor controlling a control element in the space based on the determined sequence pattern of data points.

2. The computer implemented method of claim 1 wherein:
the input data are first input data;
analyzing the input data includes:
calculating a frequency of each of the data points in the first input data;
generating second input data from the first input data by eliminating data points with a corresponding frequency less than a preselected threshold;
moving a data window across the second input data;
determining a sequence pattern based on data points in the data window as the data window moves across the second input data; and
correlating the determined sequence pattern to an activity of a user in the space; and
controlling the control element includes:
recognizing the activity of the user based on the determined sequence pattern; and
controlling the control element in the space based on the recognized activity of the user.

3. The computer implemented method of claim 1 wherein analyzing the input data includes:
moving a data window across the input data; and
determining a sequence pattern based on data points in the data window as the data window moves across the input data, the sequence pattern comprising all variations of a single sequence pattern that occur in the input data and satisfy the following condition:

$$\frac{DL(D)}{(DL(a) + DL(D \mid a)) * \Gamma_a} > C$$

where DL is a description length of a corresponding argument, D is a data point, a is a sequence pattern, C is a minimum compression threshold, and $\Gamma$ is a discontinuity factor.

4. The computer implemented method of claim 1 wherein analyzing the input data includes:
moving a data window across the input data, the data window having a length of data points;
determining a sequence pattern based on data points in the data window as the data window moves across the input data, the sequence pattern comprising all variations of a single sequence pattern that occur in the input data and satisfy the following condition:

$$\frac{DL(D)}{(DL(a) + DL(D \mid a)) * \Gamma_a} > C$$

where DL is a description length of a corresponding argument, D is a data point, a is a sequence pattern, C is a minimum compression threshold, and $\Gamma$ is a discontinuity factor; and
incrementing the length of the data window and repeating moving the data window across the input data and determining a sequence pattern until a preselected number of iterations are reached.

5. The computer implemented method of claim 1 wherein:
analyzing the input data includes determining a plurality of sequence patterns based on data points in the input data, the individual sequence patterns comprising all variations of a single sequence pattern that occur in the input data; and the method further includes grouping the plurality of determined sequence patterns into a plurality of clusters based on a similarity between the sequence patterns.

6. The computer implemented method of claim 1 wherein: analyzing the input data includes:
determining a plurality of sequence patterns based on data points in the input data, the individual sequence patterns comprising all variations of a single sequence pattern that occur in the input data and satisfy the following condition:

$$\frac{DL(D)}{(DL(a)+DL(D\,|\,a))*\Gamma_a} > C$$

where DL is a description length of a corresponding argument, D is a data point, a is a sequence pattern, C is a minimum compression threshold, and Γ is a discontinuity factor; and the method further includes grouping the plurality of determined sequence patterns into a plurality of clusters based on a similarity between the sequence patterns.

7. The computer implemented method of claim 1 wherein: analyzing the input data includes:
determining a plurality of sequence patterns based on data points in the input data; and
the method further includes:
computing an edit distance between two sequence patterns in the plurality of sequence patterns; and
grouping the two sequence patterns into a cluster if the computed edit distance is less than a threshold value.

8. The computer implemented method of claim 1 wherein: analyzing the input data includes determining a plurality of sequence patterns based on data points in the input data, the individual sequence patterns comprising all variations of a single sequence pattern that occur in the input data; and
the method further includes:
grouping the plurality of determined sequence patterns into a plurality of clusters based on a similarity between the sequence patterns; and
generating a statistical model for the individual clusters, the statistical models including at least one of a Dynamic Bayes Network, a Naïve Bayes Classifier, a Markov model, and a hidden Markov model.

9. The computer implemented method of claim 1 wherein: analyzing the input data includes:
determining a plurality of sequence patterns based on data points in the input data; and
the method further includes:
computing an edit distance between two sequence patterns in the plurality of sequence patterns;
grouping the plurality of determined sequence patterns into a plurality of clusters based on the computed edit distance; and
generating a statistical model for the individual clusters, the statistical models including a hidden Markov model.

10. The computer implemented method of claim 1 wherein:
analyzing the input data includes:
determining a plurality of sequence patterns based on data points in the input data; and
the method further includes:
computing an edit distance between two sequence patterns in the plurality of sequence patterns;
grouping the plurality of determined sequence patterns into a plurality of clusters based on the computed edit distance;
generating a statistical model for the individual clusters, the statistical models including a hidden Markov model;
collecting additional input data from the plurality of sensors; and
computing a statistical probability that the additional input data are correlating to an activity of a user in the space.

11. A computer implemented method, comprising:
a computing device determining a plurality of a sequence patterns of data points in a set of input data corresponding to a plurality of sensors in a space, the input data including a plurality of data points corresponding to each of the sensors, wherein each data point represents a sensor event and wherein at least one of the sequence patterns is at least partially discontinuous;
a computing device generating a plurality of statistical models based on the plurality of sequence patterns, the individual statistical models corresponding to an activity of a user; and
a computing device recognizing the activity of the user based on the statistical models and additional input data from the sensors.

12. The computer implemented method of claim 11 wherein:
determining a plurality of sequence patterns of data points includes determining a plurality of sequence patterns of data points in the input data, the individual sequence patterns comprising all variations of a single sequence pattern that occur in the input data; and
the method further includes grouping the plurality of sequence patterns into a plurality of clusters, the individual clusters containing sequence patterns that have a similarity greater than a preselected threshold.

13. The computer implemented method of claim 11 wherein:
determining a plurality of sequence patterns of data points includes determining a plurality of sequence patterns of data points in the input data, the individual sequence patterns comprising all variations of a single sequence pattern that occur in the input data; and
the method further includes grouping the plurality of sequence patterns into a plurality of clusters, the individual clusters containing sequence patterns that have an edit distance less than a preselected threshold.

14. The computer implemented method of claim 11, further comprising:
grouping the plurality of sequence patterns into a plurality of clusters, the individual clusters containing sequence patterns that have an edit distance less than a preselected threshold; and
generating a plurality of statistical models includes generating a plurality of statistical models individually based on each of the grouped clusters.

15. The computer implemented method of claim 11, further comprising:
grouping the plurality of sequence patterns into a plurality of clusters, the individual clusters containing sequence patterns that have an edit distance less than a preselected threshold; and
generating a plurality of statistical models includes generating a plurality of hidden Markov models individually based on each of the grouped clusters.

16. The computer implemented method of claim 11, further comprising:
grouping the plurality of sequence patterns into a plurality of clusters, the individual clusters containing sequence patterns that have an edit distance less than a preselected threshold; and
generating a plurality of statistical models includes generating a plurality of hidden Markov models individually based on each of the grouped clusters;
wherein recognizing the activity of the user includes:
collecting the additional input data from the sensors; and
computing a probability based on the additional input data from the sensors and the generated hidden Markov Models, the probability indicating a likelihood that the additional input data from the sensors correspond to an activity of a user.

17. The computer implemented method of claim 11, further comprising:
grouping the plurality of sequence patterns into a plurality of clusters, the individual clusters containing sequence patterns that have an edit distance less than a preselected threshold; and
generating a plurality of statistical models includes generating a plurality of hidden Markov models individually based on each of the grouped clusters;
wherein recognizing the activity of the user includes:
collecting the additional input data from the sensors;
computing a probability based on the additional input data from the sensors and the generated hidden Markov Models, the probability indicating a likelihood that the additional input data from the sensors correspond to an activity of a user; and
automating a control element in the space based on the computed probability.

18. The computer implemented method of claim 11, further comprising:
grouping the plurality of sequence patterns into a plurality of clusters, the individual clusters containing sequence patterns that have an edit distance less than a preselected threshold; and
generating a plurality of statistical models includes generating a plurality of hidden Markov models individually based on each of the grouped clusters;
wherein recognizing the activity of the user includes:
collecting the additional input data from the sensors;
computing a probability based on the additional input data from the sensors and the generated hidden Markov Models, the probability indicating a likelihood that the additional input data from the sensors correspond to an activity of a user, the activity having at least one of a start time and a duration;
identifying a change in the start time and/or the duration of the activity; and
generating an alarm to the user about the change.

19. A computer system, comprising:
a plurality of sensors installed in a space, the sensors being configured to provide input data including a plurality of data points corresponding to each of the sensors, wherein each data point represents a sensor event; and
a controller operatively coupled to the sensors, the controller including:
an activity miner configured to analyze the input data from the plurality of sensors to determine a plurality of sequence patterns of data points, the sequence patterns being at least partially discontinuous; and
an activity model configured to generate a plurality of statistical models based on the plurality of sequence patterns, the individual statistical models corresponding to an activity of a user.

20. The computer system of claim 19 wherein the activity miner includes:
a discontinuous varied-order sequential module configured to determine a plurality of sequence patterns of data points, wherein at least one of the sequence patterns is discontinuous; and
a clustering module configured to group the plurality of sequence patterns into a set of clusters based on similarity of the plurality of sequence patterns.

21. The computer system of claim 19 wherein:
the activity miner includes (1) a discontinuous varied-order sequential module configured to determine a plurality of sequence patterns of data points, wherein at least one of the sequence patterns is discontinuous and (2) a clustering module configured to group the plurality of sequence patterns into a set of clusters based on similarity of the plurality of sequence patterns; and
the activity model includes a hidden Markov model having a plurality of hidden nodes related to the plurality of sequence patterns via a plurality of corresponding probabilities.

* * * * *